(12) United States Patent
Altmann et al.

(10) Patent No.: US 7,889,824 B2
(45) Date of Patent: Feb. 15, 2011

(54) SYSTEM AND METHOD FOR ALIGNMENT OF CLOCK TO DATA

(75) Inventors: Michael Altmann, Folsom, CA (US); John Maddux, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 1126 days.

(21) Appl. No.: 11/540,325

(22) Filed: Sep. 28, 2006

(65) Prior Publication Data

US 2008/0080647 A1    Apr. 3, 2008

(51) Int. Cl.
*H04L 7/00* (2006.01)
(52) U.S. Cl. .................... 375/354; 375/371
(58) Field of Classification Search .............. 375/354, 375/371–376
See application file for complete search history.

(56) References Cited

U.S. PATENT DOCUMENTS

| | | | |
|---|---|---|---|
| 6,009,488 A | 12/1999 | Kavipurapu | |
| 6,895,062 B1* | 5/2005 | Wilson | 375/355 |
| 7,093,177 B2* | 8/2006 | West et al. | 714/738 |
| 2004/0114698 A1* | 6/2004 | Barrett et al. | 375/355 |
| 2005/0206416 A1* | 9/2005 | Kizer | 327/156 |
| 2006/0294411 A1* | 12/2006 | Shrank et al. | 713/500 |

\* cited by examiner

*Primary Examiner*—Curtis B Odom
(74) *Attorney, Agent, or Firm*—Blakely, Sokoloff, Taylor & Zafman LLP (57) ABSTRACT

A system and method for training a clock signal are described. The method includes determining a first position of a clock signal by training the clock signal using a first test data, determining a final position of a clock signal by training the clock signal using a second test data, and using the offset between these positions to speed up subsequent trainings.

16 Claims, 14 Drawing Sheets

SYSTEM AND METHOD FOR ALIGNMENT OF CLOCK TO DATA

BACKGROUND OF THE INVENTION

1. Field of the Invention

This invention relates to timing alignment. More particularly, the invention relates to a system and method for improving alignment of a clock signal to a data signal.

2. Description of the Related Art

Switching elements that transfer data in a computing system take an amount of time to switch between a signal '0' and a signal '1', and vice-versa. Since switching elements change voltage levels when changing logic states, all elements have some sort of "timing uncertainty" attributed to ramping the voltage, a jitter from power supply noise, switching, and other sources. As the transfer speed of data increases, the timing uncertainty causes less time to exist where the data transferred can be read successfully on an edge of a clock signal. Hence, alignment of the clock signal for a data line is important to ensure that data may still be read.

To align a clock signal to a data signal, the position of the clock signal in relation to the data signal is "trained." The position is trained by placing a signal on the source for a data signal (e.g., one end of a BUS line), moving the position of the clock signal related to the data signal, and reading the signal on the destination of the data signal (e.g., the other end of the BUS line). The data is checked and the clock signal moved until the system determines no errors exist in reading the data.

One data pattern used to train the alignment of the clock signal is a "clock pattern" (i.e., 1-0-1-0). The data pattern is short and allows the training time to be minimized. One problem with use of the clock pattern is that the clock pattern is not a thorough trainer in aligning the clock signal, due to the absence of electrical impairments such as crosstalk and ISI, and therefore more errors than wanted may occur in reading the data signal.

Another data pattern used to train the alignment of the clock signal is a random data pattern. Training with a random data pattern instead of a clock pattern is better able to find the optimal position for the clock signal. One problem with use of the random data pattern is that the random data pattern is longer than the clock pattern (e.g., 256 bits compared to 16 bits). Therefore, training with the random data pattern takes a significantly longer time than training with the clock pattern.

While a system is in use, the position of the clock signal in relation to the data signal will shift over time. The position may move due to temperature, voltage, or other changes in the system. As a result, the system should periodically retrain the clock signal during the system's operation. The interval at which the clock signal should retrain is dependent on how quickly the clock position may move due to these changes. Because the clock signal is retrained while the system is in operation, retraining time should be kept to a minimum.

Therefore, what is needed is an improved system and method for training the alignment of a clock signal to a data signal that is fast like the "clock pattern" training but accurate like the "random data pattern" training.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for aligning a clock signal to a data signal are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

System Architecture

Figure 1:
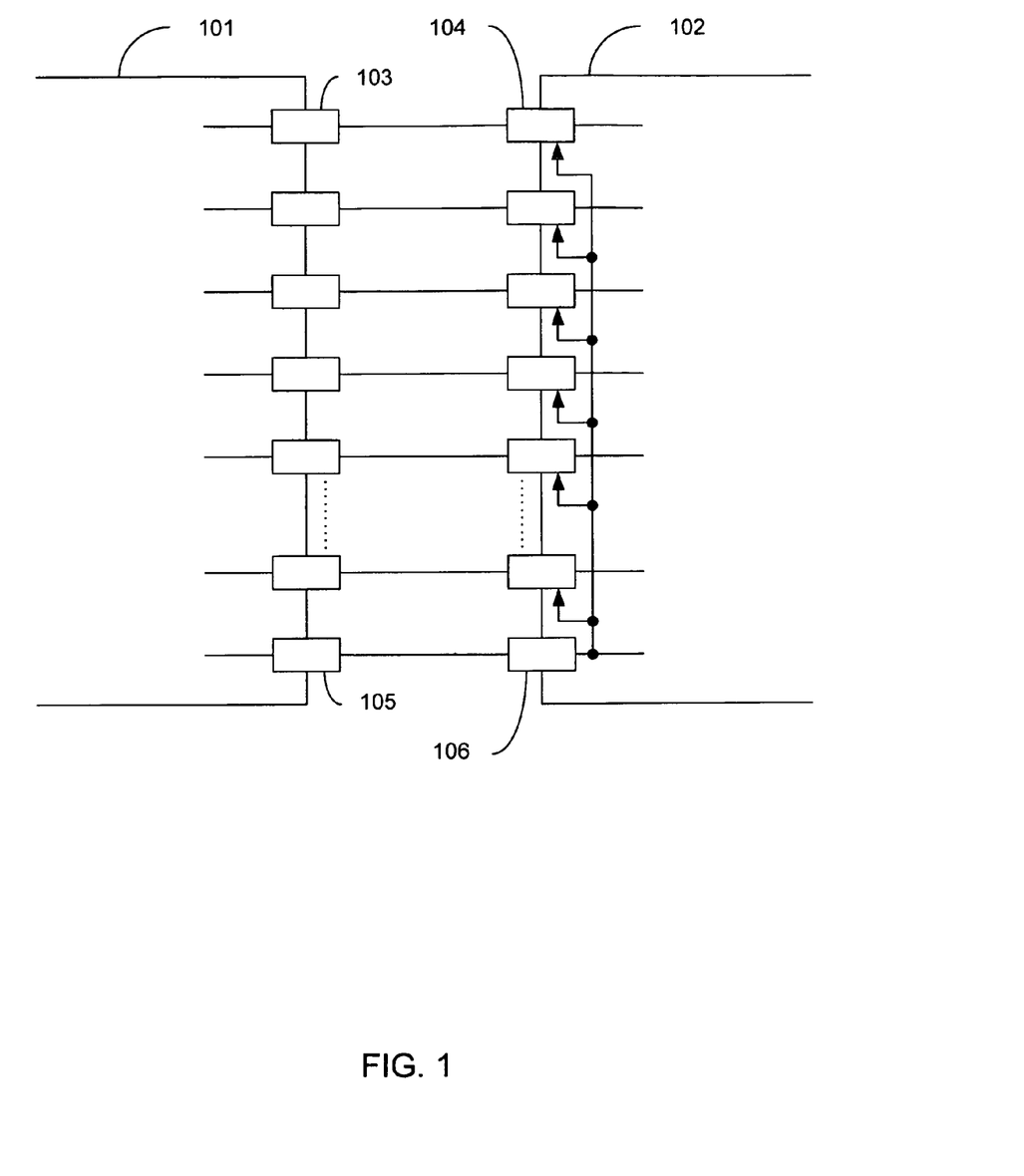
FIG. 1 illustrates an exemplary embodiment of the architecture of a system to train the position of a clock signal to a data signal.

FIG. 1 illustrates an exemplary architecture of a system that aligns clock signals to corresponding data signals. The system generally includes a transmitter 101 to transmit data signals and a clock signal and a receiver 102 to receive those signals from the transmitter 101. The transmitter 101 generally comprises data ports 103 and a clock port 105 to transmit data and clock signals to the receiver 102. The receiver 102 generally comprises data ports 104 and a clock port 106 to receive the data and clock signals from the transmitter 101.

The receiver 102 uses the clock signal from port 106 to read data signals received by the data ports 104. Each data port 104 of the receiver 102 may individually modify the phase shift (position) of its received clock signal in order to align that clock signal to the received data signal. A phase shifter (e.g., a Phase Lock Loop [PLL], Delay Locked Loop [DLL], voltage phase shifter, current phase shifter, etc.) is used by the data port 104 to align the clock signal to the data signal.

In the exemplary embodiment, the phase shifter buffers the clock signal by up to one clock cycle (360 degrees). Since the clock signal is cyclical, a clock signal plus 360 degree phase shift are equivalent. Therefore, to shift the phase of the clock signal backward X degrees, the phase shifter shifts the phase of the clock signal forward (360−X) degrees.

The Clock and Data Signals

Figure 4:
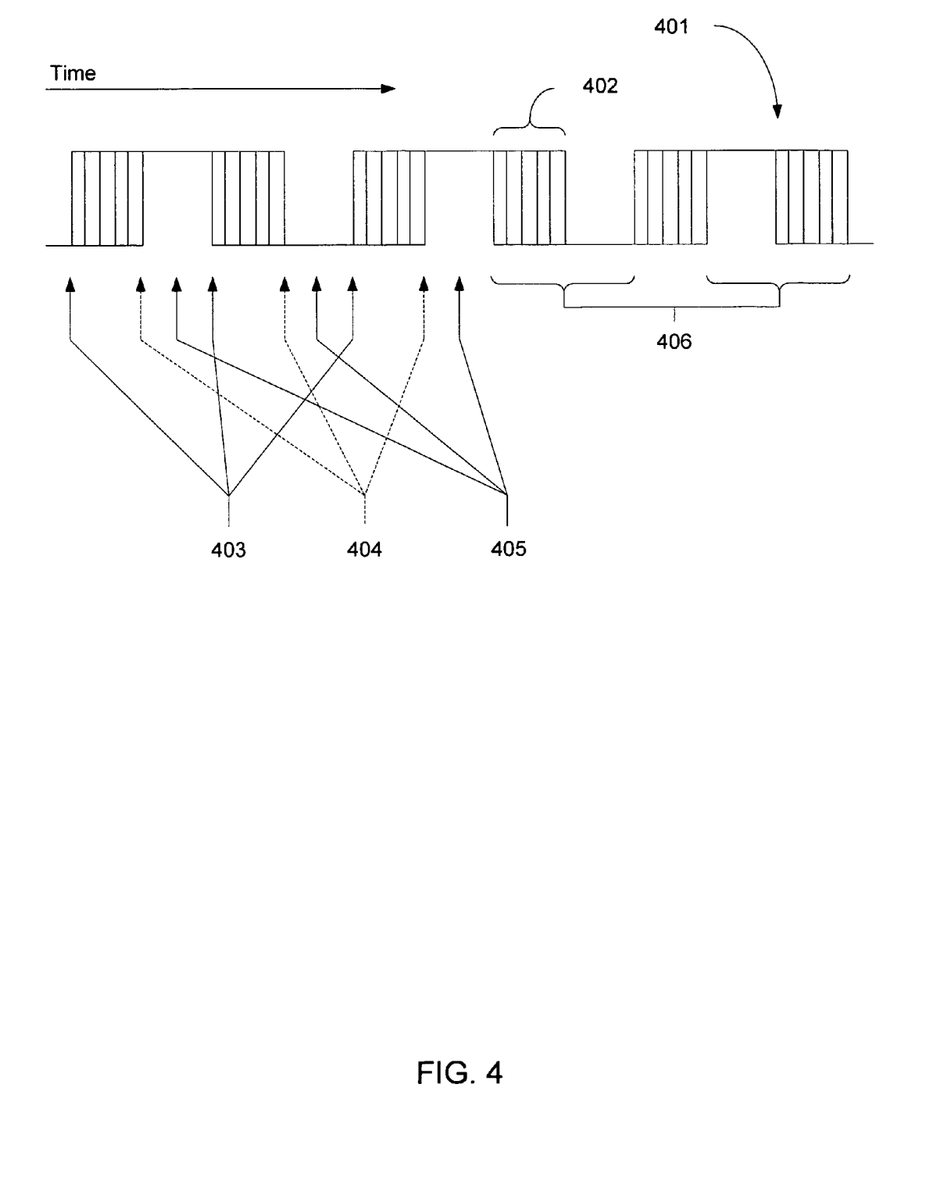
FIG. 4 illustrates a received data signal of the system.

FIG. 4 illustrates an exemplary data signal 401 received by one of the data ports (104) of the receiver 102. Data signal 401 is an example of a received clock pattern signal (the pattern alternates, 1-0-1-0-1, etc.) for training a clock signal to the data signal. While the receiver 102 receives the data signal 401, there exists a timing uncertainty 402 when the signal level switches from a logic 1 or 0 to a logic 0 or 1, respectively. The data signal 401 between timing uncertainties 402 are "eyes." In aligning the clock signal to the data signal, the receiver 102 will determine the right edges 403 of the eyes of the data signal, the left edges 404 of the eyes of the data signal, and the eye centers 405 of the data signal.

The right edges 403 of the data signal 401 are located where the timing uncertainties 402 begin for switching between logic states. The left edges 404 of the data signal 401 are located where the timing uncertainties 402 end for switching between logic states. The center of the eye 405 is halfway between the left edge 404 and right edge 403.

In systems where data is read only on the upswing of the clock signal, the frequency of the clock signal 406 is twice the frequency of the data signal (i.e., the wavelength of the clock signal is half the wavelength of the data signal). In systems that read data on the upswing and the downswing of the clock signal, the frequency of the clock signal is the same frequency as the data signal.

In both systems, between the time two data points (i.e., between two upswings of the clock signal or between the upswing and downswing of the clock signal) are read, a right edge 403, left edge 404, and center of the eye 405 will exist in the data signal. For the exemplary embodiment, it is assumed that the right edge 403, left edge 404, and center of the eye 405 are located at the same position of the waveform of the corresponding clock signal for each passing wave of the clock signal. Therefore, each right edge 403, left edge 404, and center of the eye 405 are the same distance from the successive right edge 403, left edge 404, and center of the eye 405, respectively.

Reading data from the data signal 401 during a timing uncertainty 402 may cause an error. The error may be a result of the signal being between logic states (neither a zero or one) because of jitter or the time needed to change voltage levels to signify a zero or a one. Therefore, reading data at the eyes of the data signal will result in fewer errors than if data is read closer to the switching delays. Since the eye center 405 is the point of the data signal 401 farthest from the previous switching delay and the successive switching delay of the data signal 401 (as illustrated in FIG. 4), the eye center 405 should be the point of the eye of the data signal 401 where the least amount of errors occur in reading the data signal.

Training and Retraining the Clock Signal

In training or retraining the clock signal, the clock signal position is aligned to the center of the eye of the test pattern data signal. In the exemplary embodiment of the invention, the center of the eye is found by determining the halfway distance between the left edges and the successive right edges of the data signal. Therefore, the left edges and the right edges of the data signal are first found. Then, the eye center is computed by averaging the positions of the left and right edges (e.g., {left edge+right edge}/2). Once the center of the eye is determined, the clock signal is set to the position of the eye center in the data signal (thus finding a position for the clock signal).

Figure 5:
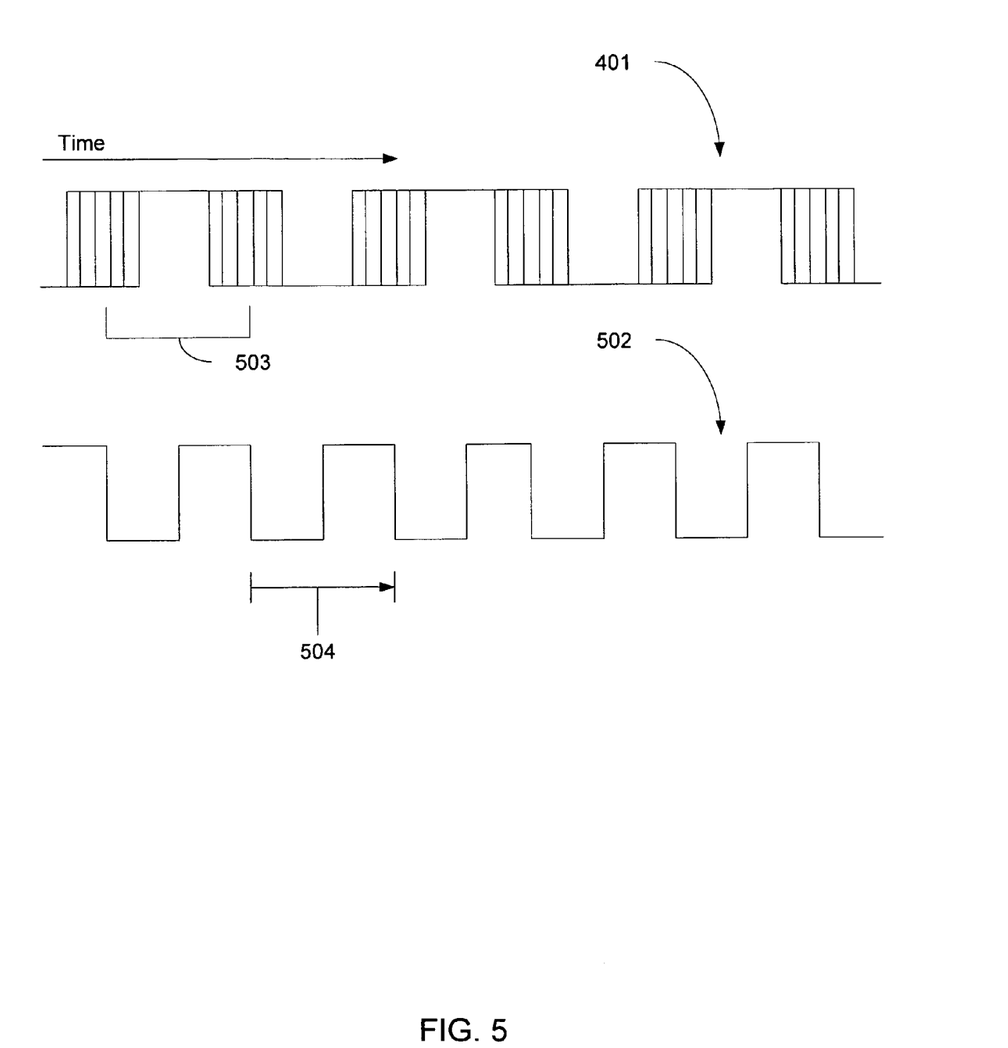
FIG. 5 illustrates the received data signal of FIG. 4 and its corresponding clock signal.

Referring to FIG. 5, the clock signal 502 may be buffered by up to 360 degrees 504 (i.e., up to one clock cycle) to train the clock signal 502 to the eye center of the data signal 401. As previously stated, if the clock signal 502 should be advanced X degrees, the clock signal 502 is buffered (360−X) degrees. FIG. 5 illustrates a final training position 503 (alignment) of a clock signal 502 to the example data signal 401. The upswing of the clock signal 502 is located at the eye center of the data signal 401.

As previously stated, a clock pattern is not as successful as a random data pattern in training the clock signal to align to the eye centers of the data signal. However, the difference (offset) between the clock signal position determined using a clock pattern and the clock signal position determined using a random data pattern is relatively constant.

Therefore, the clock signal is initially trained using both the clock pattern data signal and the random data pattern data signal. During initial training, the offset between the two determined clock positions is determined. In retraining the clock signal, the clock pattern data signal and the offset are used to find the retrained clock signal position. Using the offset for retraining instead of retraining using the random data pattern and the clock pattern allows for a faster retraining time of the clock signal and has better results than retraining the clock signal only with a clock pattern data signal.

Figure 6:
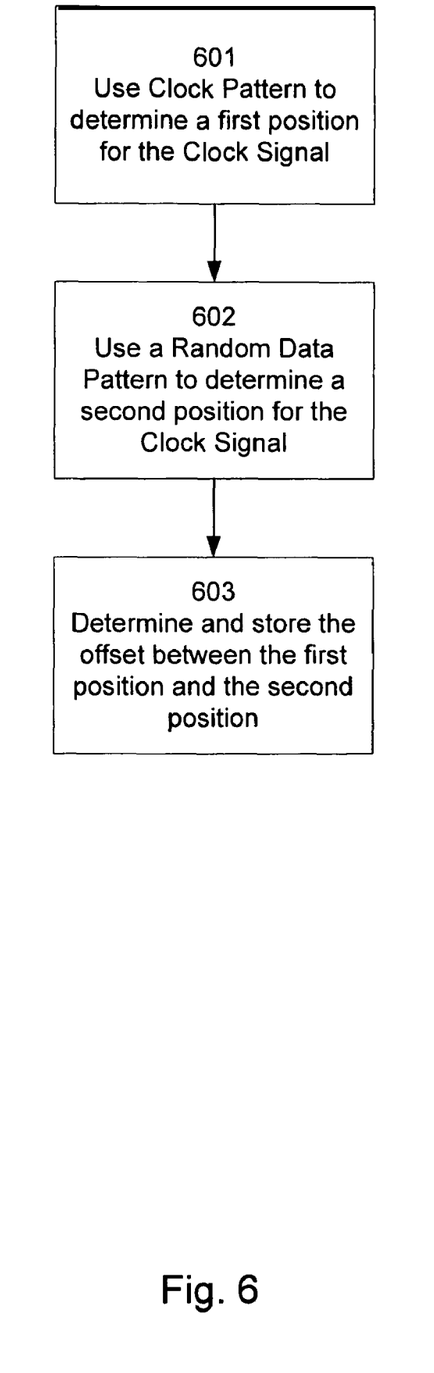
FIG. 6 illustrates an exemplary flow of training the position of the clock signal to the data signal.

FIG. 6 illustrates the flow of initially training the position of a clock signal to the data signal. Beginning at 601, a clock pattern data signal is used to determine a first position for a clock signal. If no other training of the clock signal is involved, the first position is the position of the clock signal in relation to the data signal for reading data carried on the data signal. At 602, a random data pattern is used to determine a second position for the clock signal. The second position is the position of the clock signal when the receiver 102 begins to receive actual data. At 603, the offset between the first clock position and the second clock position is determined and stored. In a specific example, if the second position is determined to be a 47 degrees phase shift from the first position, then the 47 degrees is saved as an offset.

Figure 7:
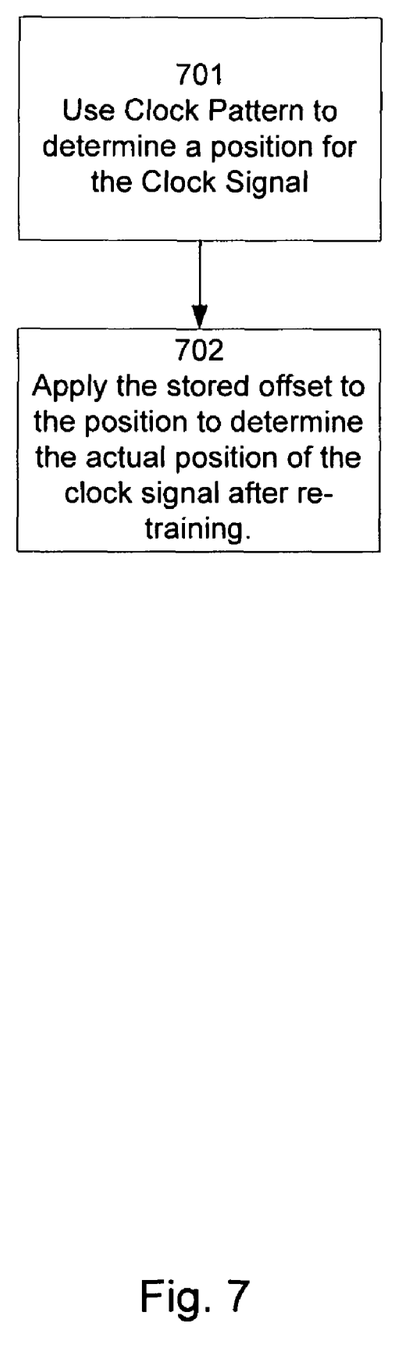
FIG. 7 illustrates an exemplary flow of retraining the position of the clock signal to the data signal.

FIG. 7 illustrates the flow of retraining the position of the clock signal in the exemplary embodiment. Beginning at 701, the clock pattern data signal is used to find a position for the clock signal. At 702, an offset (such as the one calculated by the flow described in FIG. 6) is then applied to the position to determine the retrained position of the clock signal (402).

Figure 8:
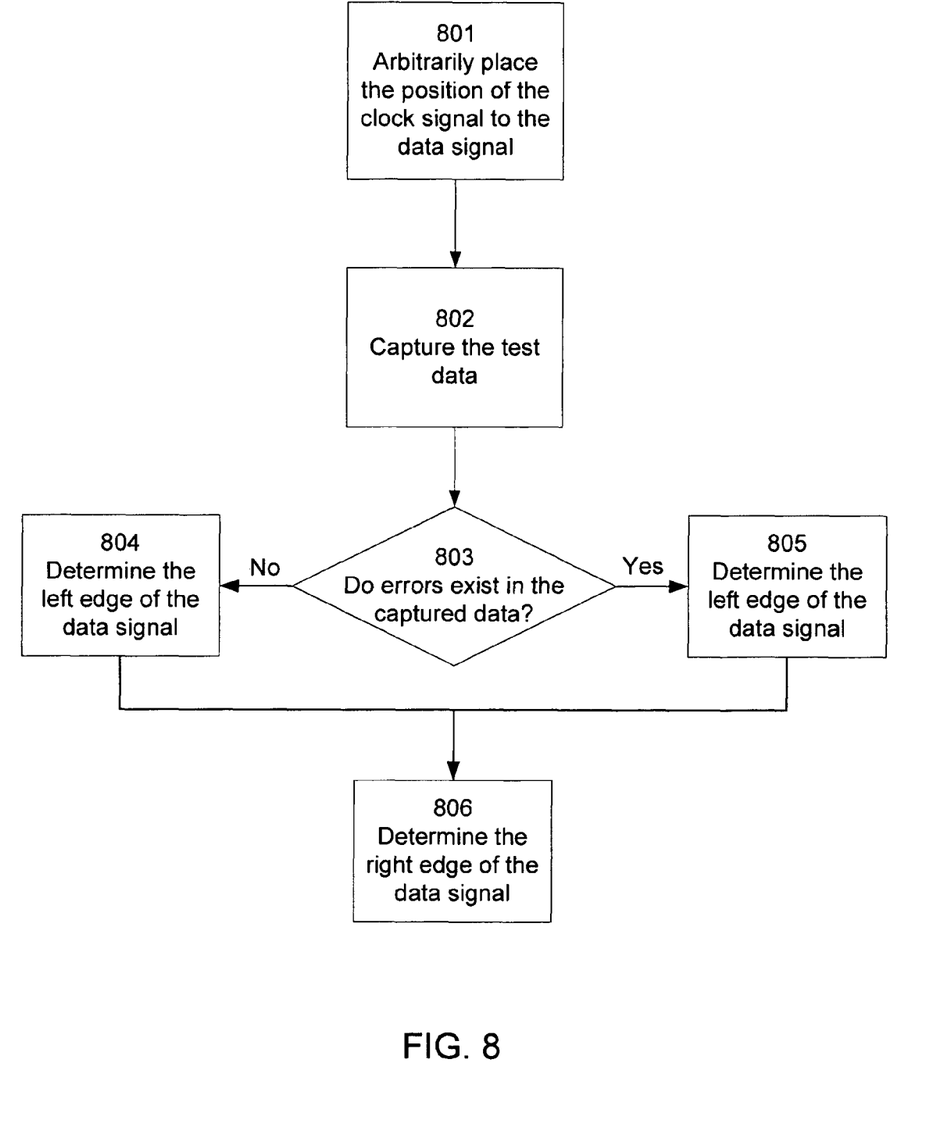
FIG. 8 illustrates an exemplary flow of determining the left and right edges of a data signal using a test pattern.

FIG. 8 illustrates the flow of determining the left and right edges of the data signal. Beginning at 801, the clock signal is aligned to an arbitrary position of the test data signal. The test data signal is generated by applying the test pattern (e.g., the clock pattern or the random data pattern) to the data line. In the exemplary embodiment, initiating the clock signal is independent of generating the data signal (e.g., the receiver 102 directly forwards the incoming clock signal to each data signal port).

Figure 9:
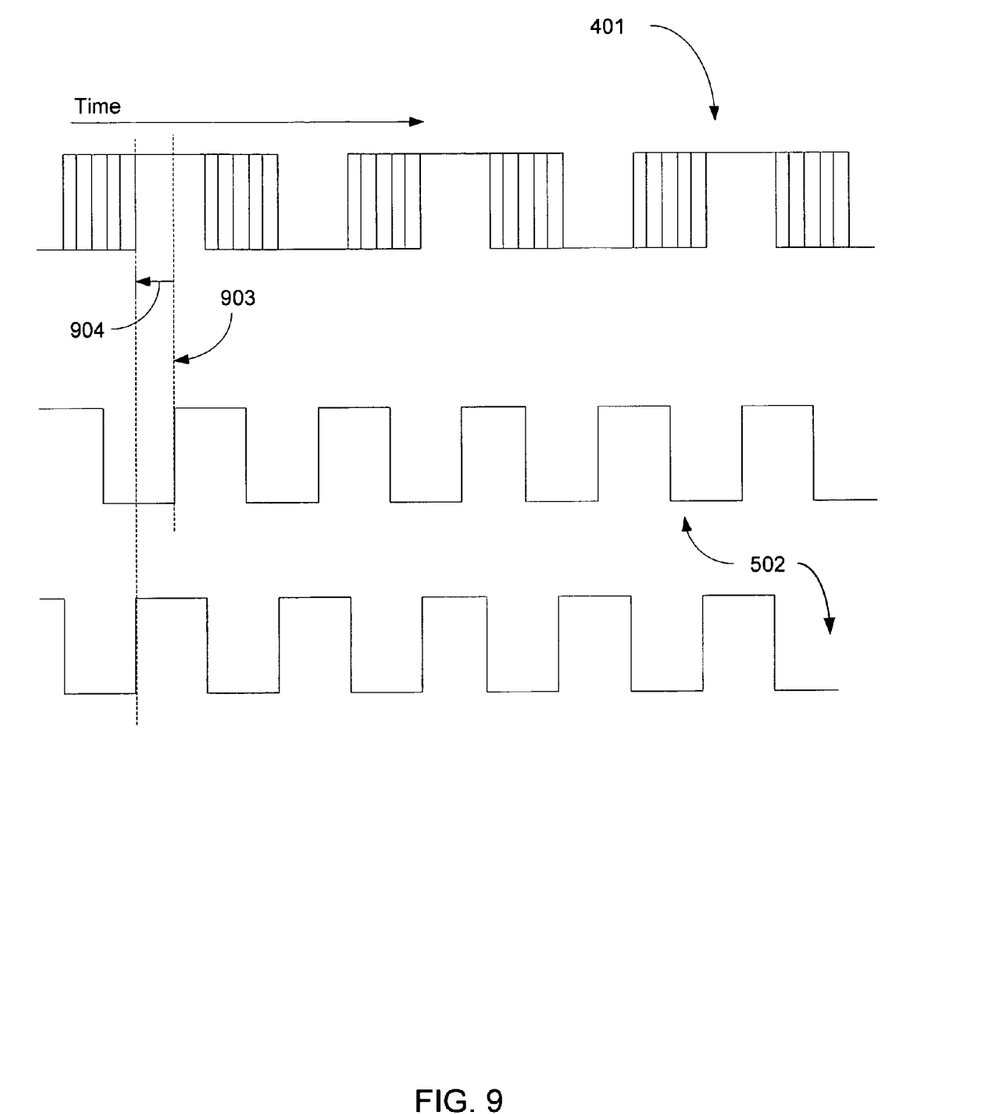
FIG. 9 illustrates an example of the clock signal being positioned in the closed portion of the data signal and finding the left edge of the data signal.
Figure 10:
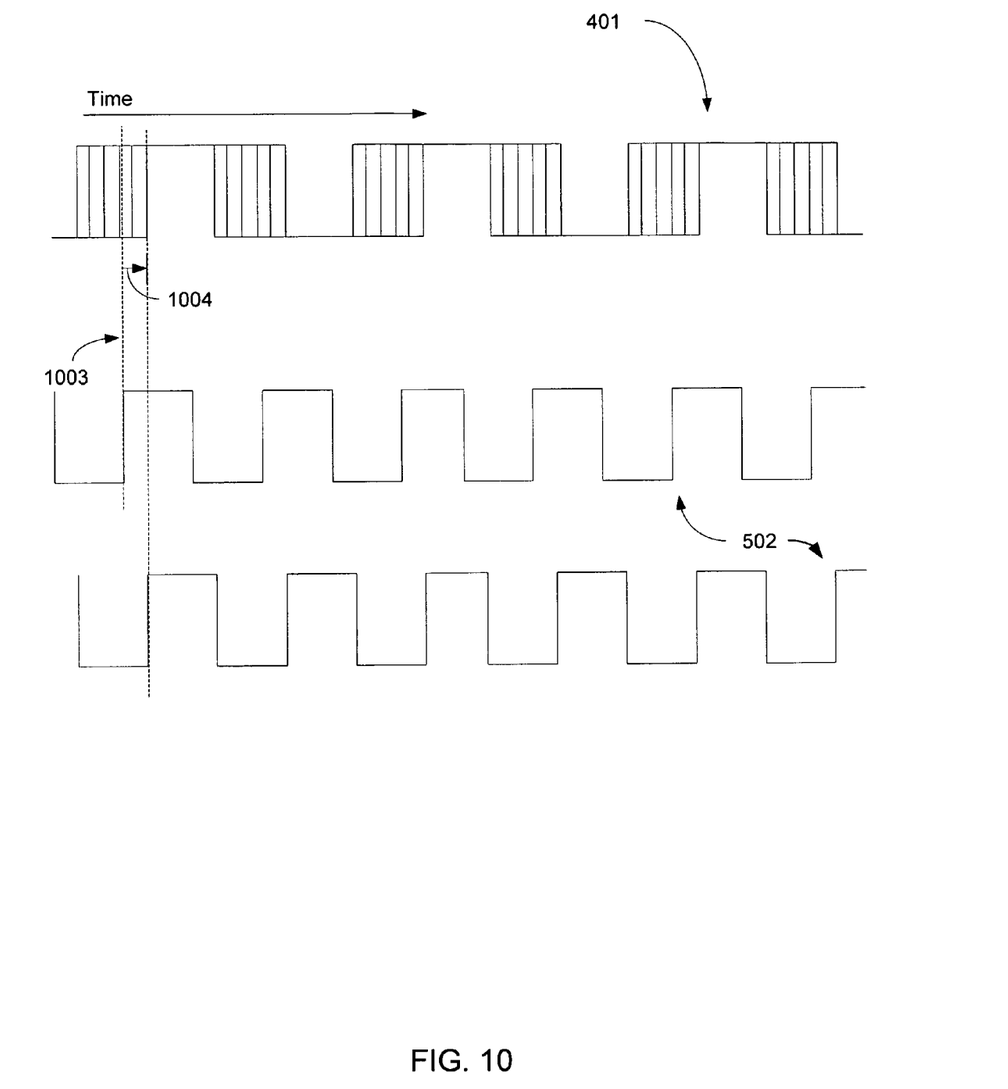
FIG. 10 illustrates an example of the clock signal being positioned in the open portion of the data signal and finding the right edge of the data signal.

FIGS. 9 and 10 illustrate an example of the clock signal 502 arbitrarily being aligned to the data signal 401. In FIG. 9, the upswing 903 of the clock signal 502 is in the portion of the data signal 401 where no error exists in reading the data. No error exists in reading the data when the clock signal is placed at or near the center of the eye, away from the timing uncertainty. This is called the "open" portion of the data signal. In FIG. 10, the upswing 1003 of the clock signal 502 is in the portion of the data signal 401 where an error may exist when reading the data. As previously stated, an error may exist if the data is read during the timing uncertainty of the data signal 401. The portion of the data signal 401 containing the timing uncertainty is called the "closed" portion of the data signal 401.

Referring back to FIG. 8, once the clock signal 502 is arbitrarily aligned to the data signal 401, the receiver 102 captures the test data of the incoming data signal at 802. The receiver 102 then determines whether errors exist in the captured data pattern at 803. For example, after capturing the data of a clock pattern test data signal, the receiver 102 determines whether the captured data pattern is a clock pattern (i.e., 1-0-1-0). The receiver 102 may store the random data pattern to compare a random data pattern to the captured data pattern. In the exemplary embodiment, the receiver 102 stores the pattern in a register. Other embodiments may determine if errors exist in the captured data pattern without comparing it to a pre-defined or stored pattern.

If errors do not exist in the captured data pattern, then the upswing of the clock signal 502 is in the open portion of the data signal 401. Therefore, the receiver 102 determines the left edge of the data signal at 804. The receiver 102 also aligns the upswing of the clock signal 502 to the left edge of the data signal 401.

FIG. 9 illustrates the upswing of the clock signal 502 positioned in the open portion of the data signal 401. The receiver 102 adjusts the phase of the clock signal 502 by phase length 904 to align the upswing of the clock signal 502 to the left edge of the data signal 401.

Figure 11:
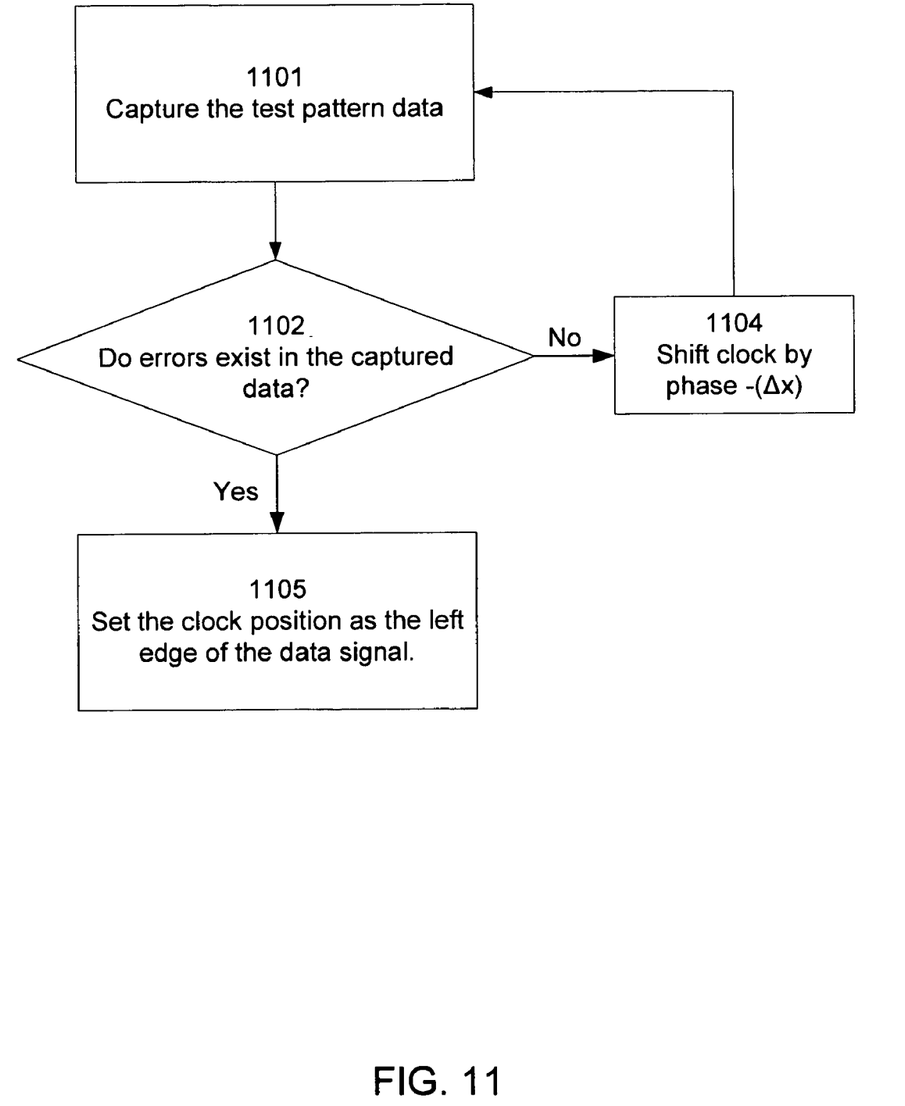
FIG. 11 illustrates an exemplary flow of determining the left edge of a data signal.

FIG. 11 illustrates the flow of aligning the upswing of the clock signal 502 to the left edge of the data signal 401. Beginning at 1101, the receiver 102 captures the test data of the incoming data signal.

After capturing the data, the receiver 102 determines whether errors exist in the captured data pattern at 1102. As before, if errors do not exist, then the upswing of the clock signal 502 is still in the open portion of the data signal 401. Therefore, the receiver 102 shifts the clock signal by a negative phase Δx. The phase Δx may be predetermined, user defined, or the smallest increment that the clock signal phase is adjustable by (e.g., hardware limits the minimum size of adjusting the clock signal phase).

Since the receiver 102 should shift the clock signal by negative phase Δx, the receiver 102 buffers the clock signal by positive phase (360−Δx) degrees. Once the receiver 102 buffers the clock signal, the receiver 102 again captures the test data of the incoming data signal back at 1101. The process of shifting the clock signal, capturing the data, and determining if errors exist in the captured test pattern repeats until errors exist in the captured test pattern. If errors exist in the captured test pattern, the receiver 102 sets the upswing of the clock signal 502 as the left edge of the data signal 401 (1105). Therefore, in the example illustrated in FIG. 9, the receiver 102 adjusted the phase of the clock signal 502 by 904.

Referring back to FIG. 8, if errors exist in the captured data pattern at 803, then the upswing of the clock signal 502 is in the closed portion of the data signal 401. Therefore, the receiver 102 determines the left edge of the data signal at 805. The receiver 102 also aligns the upswing of the clock signal 502 to the left edge of the data signal 401.

Figure 12:
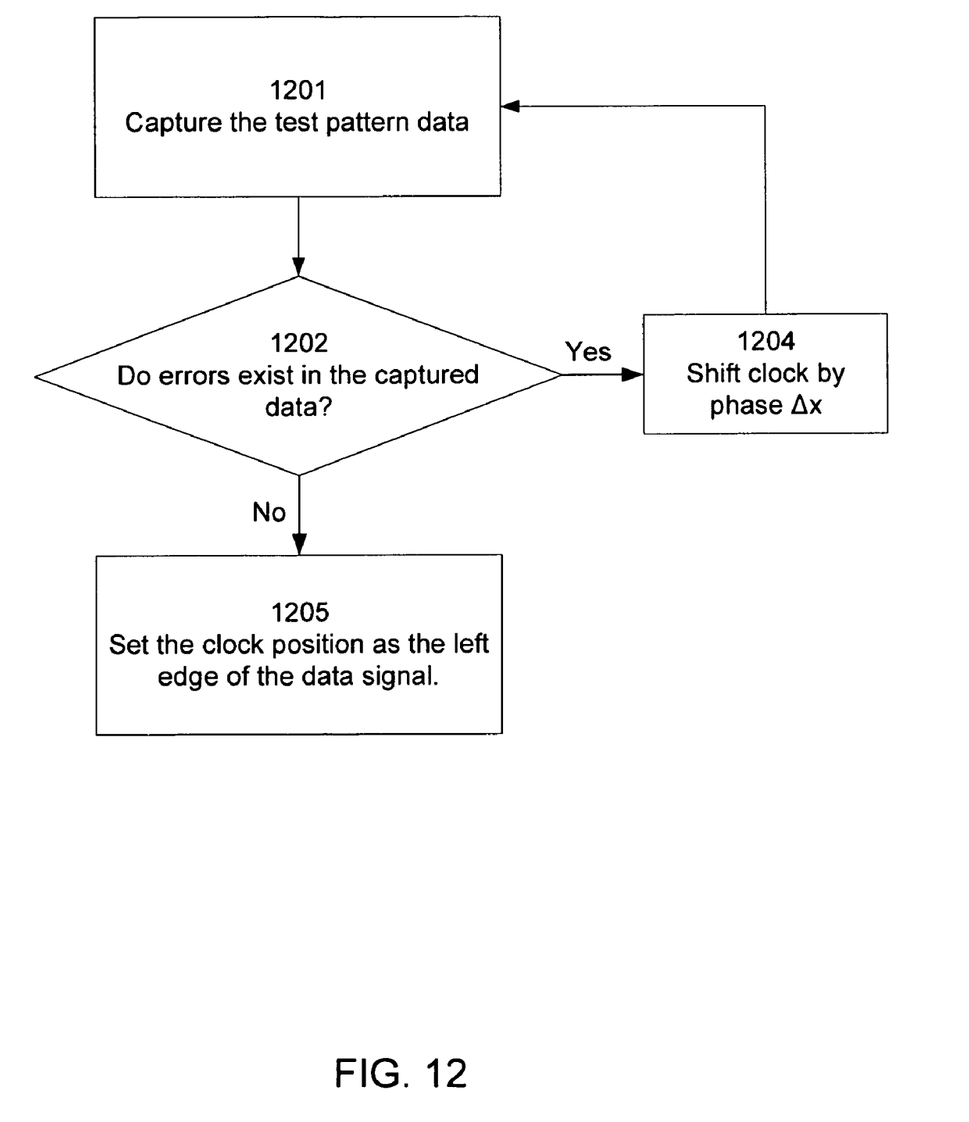
FIG. 12 illustrates as exemplary flow of determining the right edge of a data signal.

FIG. 10 illustrates the upswing of the clock signal 502 positioned in the closed portion of the data signal 401. To align the upswing of the clock signal 502 to the left edge of the data signal 401, the receiver 102 adjusts the phase of the clock signal 502 by phase length 1004. FIG. 12 illustrates the flow of aligning the upswing of the clock signal 502 to the left edge of the data signal 401. Beginning at 1201, the receiver 102 captures the test data of the incoming data signal. Initially capturing the data at 1201 may be the same as capturing the data at 802.

After capturing the data, the receiver 102 determines whether errors exist in the captured data pattern at 1202. As before, if errors exist, then the upswing of the clock signal 502 is still in the closed portion of the data signal 401. Therefore, the receiver 102 shifts the clock signal by a positive phase Δx. The phase may be the same as used when shifting by a negative phase Δx or a different user defined value.

Once the receiver 102 buffers the clock signal by phase Δx, the receiver 102 again captures the test data of the incoming data signal back at 1201. The process of shifting the clock signal, capturing the data, and determining if errors exist in the captured test pattern repeats until no errors in the captured test pattern. If no errors exist in the captured test pattern, the receiver 102 sets the upswing of the clock signal 502 as the left edge of the data signal 401 (1205). Therefore, in the example illustrated in FIG. 10, the receiver 102 adjusted the phase of the clock signal 502 by 1004.

Once the left edge of the data signal is determined in 804 or 805, the right edge of the data signal is determined 806. To determine the right edge of the data signal in 806, the flow illustrated in FIG. 12 is used. The initial position of the clock signal in determining the right edge is the calculated left edge of the data signal (where the clock signal ended in 804 or 805).

Therefore, the receiver 102 determines both the left edge and the right edge of the data signal. Afterwards, the receiver 102 determines the midpoint (eye center) between the determined left edge and the determined right edge. The receiver 102 then shifts the phase of the clock signal so that the upswing of the clock signal aligns with the computed eye center of the data signal.

Referring back to FIG. 6, the receiver 102 thus determines the left edge, right edge, and eye center of a data signal using a clock pattern in 601. The upswing of the clock signal is then aligned with the computed eye center of the data signal. From this clock position, the receiver 102 then determines the left edge, right edge, and eye center of a data signal using a random data pattern in 602. The upswing of the clock signal is then aligned with the computed eye center of the data signal from the random data pattern. As previously stated, this clock signal position is the final position. At 603, the offset is determined by determining the phase difference between the two computed eye centers (one eye center from training with the clock pattern signal and one eye center from training with the random data pattern signal).

Referring back to FIG. 7, the left edge, right edge, and eye center of the data signal are determined in 701 during initial training. When a defined retraining interval has expired, it is time to retrain the clock signal 702. For retraining, when determining the left and right edges of the data signal using a clock pattern in retraining the clock signal (FIGS. 7 and 8), the beginning arbitrary clock position of 801 in FIG. 8 is the current clock position being used by the receiver 102 for the data line. Therefore, the clock signal does not need to be initially repositioned or regenerated. Once the clock pattern retraining is completed, the offset determined in 603 is applied to the center of the eye determined by the clock pattern retraining.

In one embodiment, the receiver 102 stores all determined values. For example, each time the clock signal is trained, each computed left edge, right edge, eye center, and offset are stored by the receiver 102.

In the above description, specific embodiments of the present invention are described. Different embodiments of the present invention exist, though, that do not deviate from the scope of the invention. For example, the receiver training and retraining the clock signal have been described. Training may be implemented, though, by the transmitter or some other module.

Figure 2:
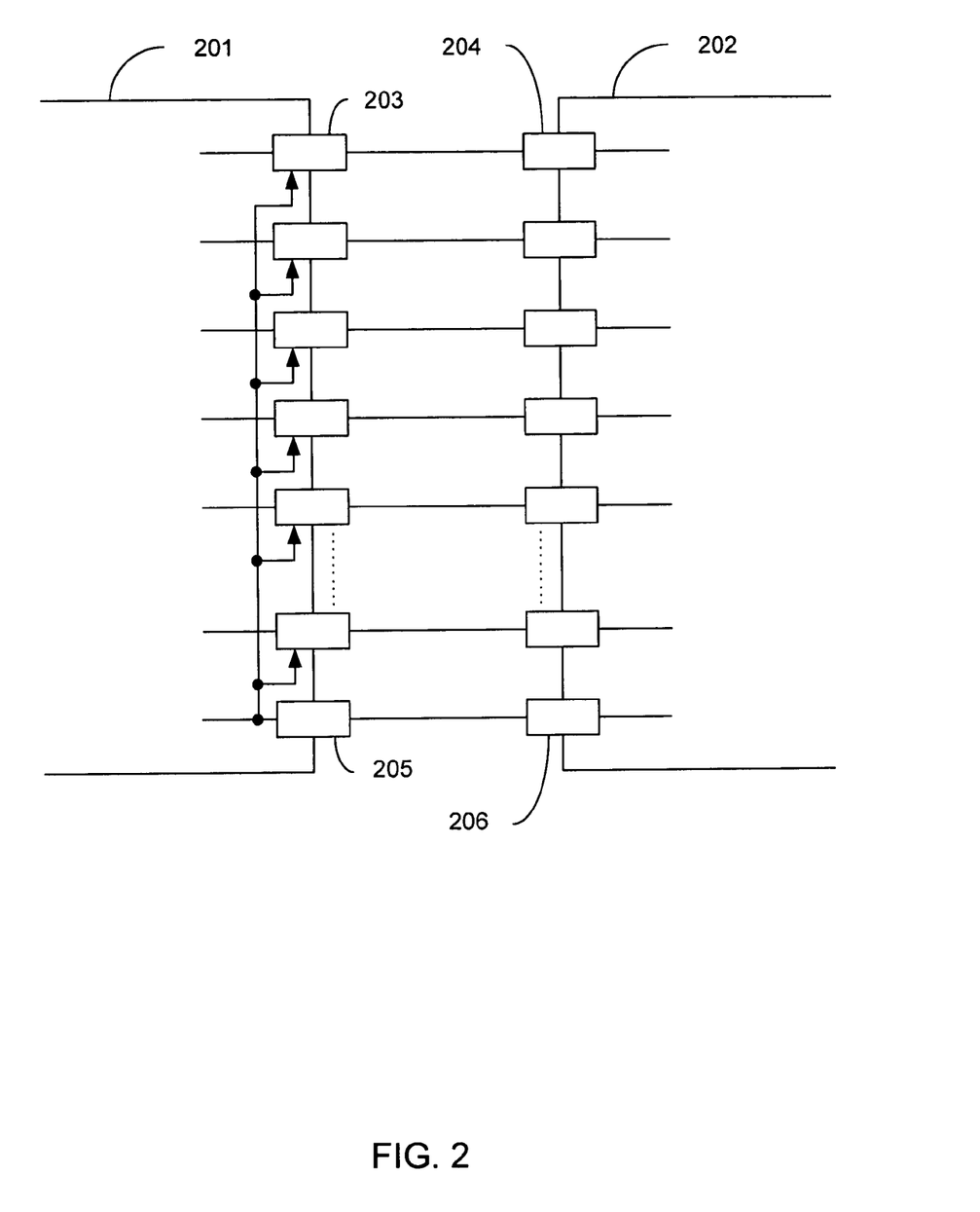
FIG. 2 Illustrates another embodiment of the architecture of the system to train the position of a clock signal to a data signal.

For example, FIG. 2 illustrates an embodiment of the architecture of the system that aligns clock signals to corresponding data signals. Each data port 103 of the transmitter 101 may individually modify the phase of its data signal so that the data signals will align with the received clock at port 106 when received by the receiver 102. This is in contrast to what is shown in FIG. 1 where the data ports 104 of the receiver 102 shift the phase of the clock signal.

Figure 3:
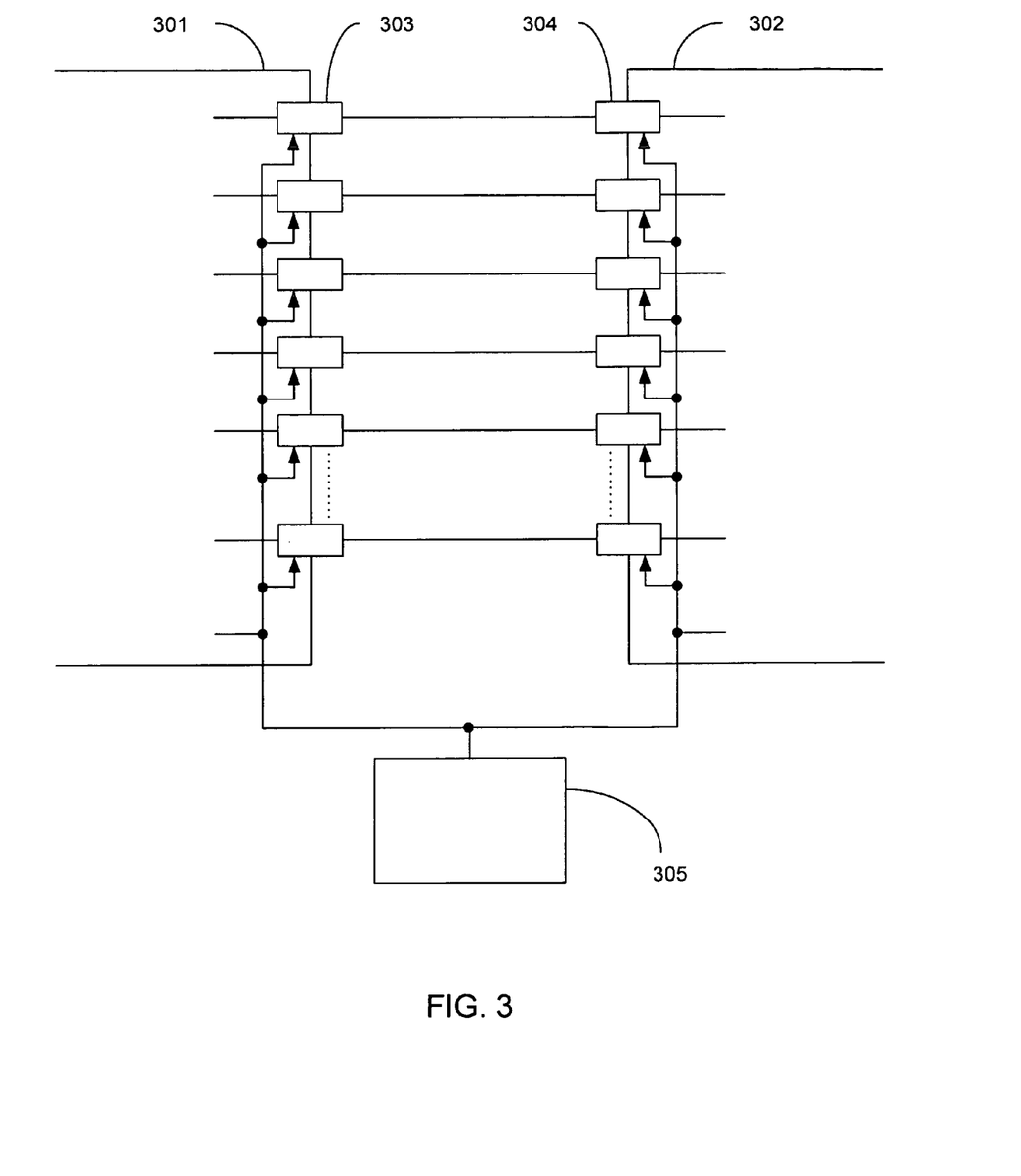
FIG. 3 illustrates another embodiment of the architecture of the system to train the position of a clock signal to a data signal.

FIG. 3 illustrates an embodiment of the architecture of the system that aligns clock signals to corresponding data signals. The system of phase shifting a clock signal to its corresponding data signal at the receiver 102 is the same as in the system illustrated in FIG. 1. The difference between the systems illustrated in FIGS. 1 and 3 is that the clock signal is sent from a third module 305 to all the components of the system (e.g., transmitter 101 and receiver 102) instead of from the transmitter 101 to the receiver 102.

In addition, specific hardware implementation of components is not discussed as it is not required by the present invention. For example, the receiver may include a PLL, DLL, or some other phase shifter; combinational logic to compute a midpoint; and a bank of registers or some other memory to store computed phases. In addition, a memory controller may exist in each module of the system or processor so that each module has direct access to main memory. Also, a system of processors may be configured so that one processor is the transmitter and the remaining processors are receiving agents for the training the clock signal.

Embodiments of the invention may be implemented on any data line that periodically retrains the clock signal. Furthermore, devices or circuits that include embodiments of the invention may be included within a variety of computer systems, including a point-to-point (P2P) computer system and shared bus computer systems. Embodiments of the invention may also be included in other computer system topologies and architectures.

Specific systems that the present invention may be implemented include memory busses for Double-Data-Rate (DDR) RAM, SDRAM, etc.; Front Side Busses (FSB); Peripheral Component Interconnect (PCI) busses; and Expander Busses. The present invention cannot be implemented on a PCI-Express bus because the bus always retrains the clock signal without a break.

Figure 13:
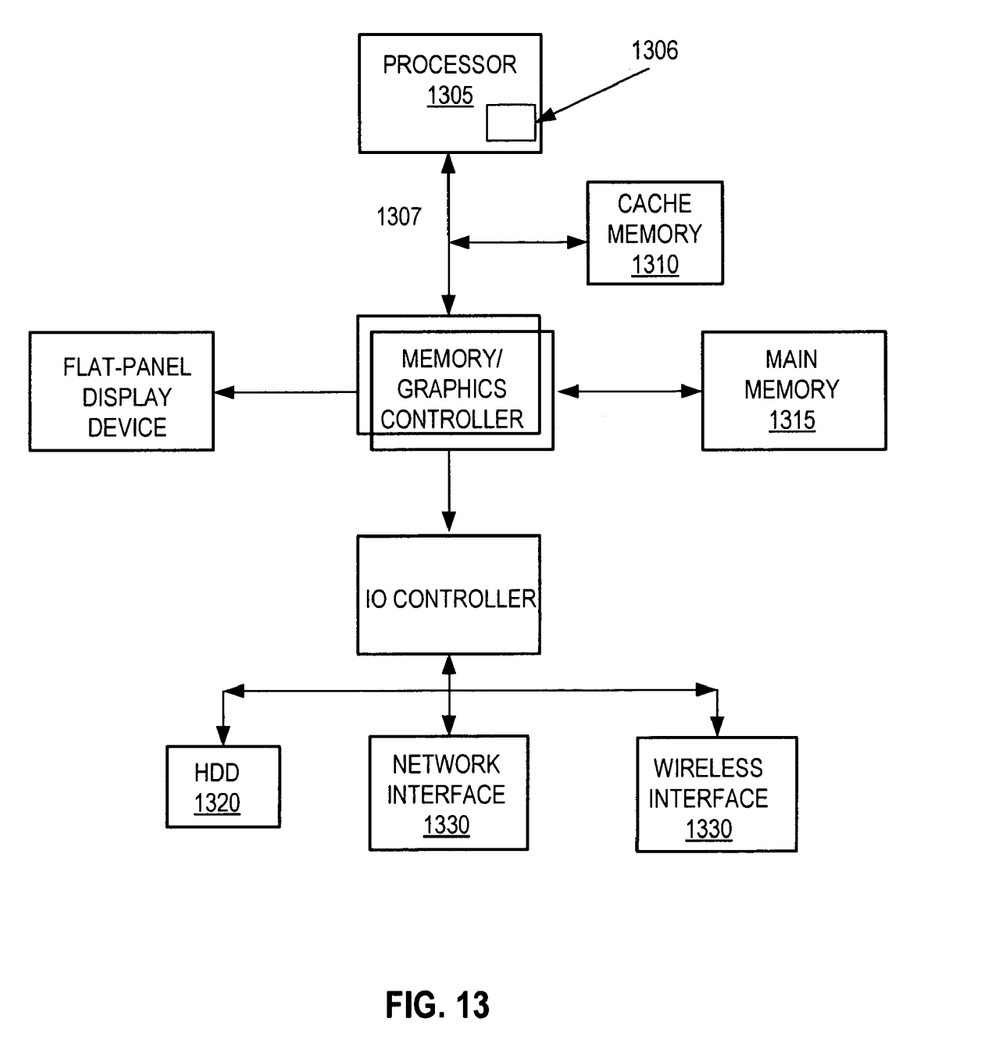
FIG. 13 illustrates an exemplary front-side-bus (FSB) computer system in which one embodiment of the invention may be used.

FIG. 13, for example, illustrates a front-side-bus (FSB) computer system in which one embodiment of the invention may be used. A processor 1305 accesses data from a level one (L1) cache memory 1310 and main memory 1315. In other embodiments of the invention, the cache memory may be a level two (L2) cache or other memory within a computer system memory hierarchy. Furthermore, in some embodiments, the computer system of FIG. 13 may contain both a L1 cache and an L2 cache.

The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 1320, or a memory source located remotely from the computer system via network interface 1330 containing various storage devices and technologies. The cache memory may be located either within the processor or in close proximity to the processor, such as on the processor's local bus 1307.

Figure 14:
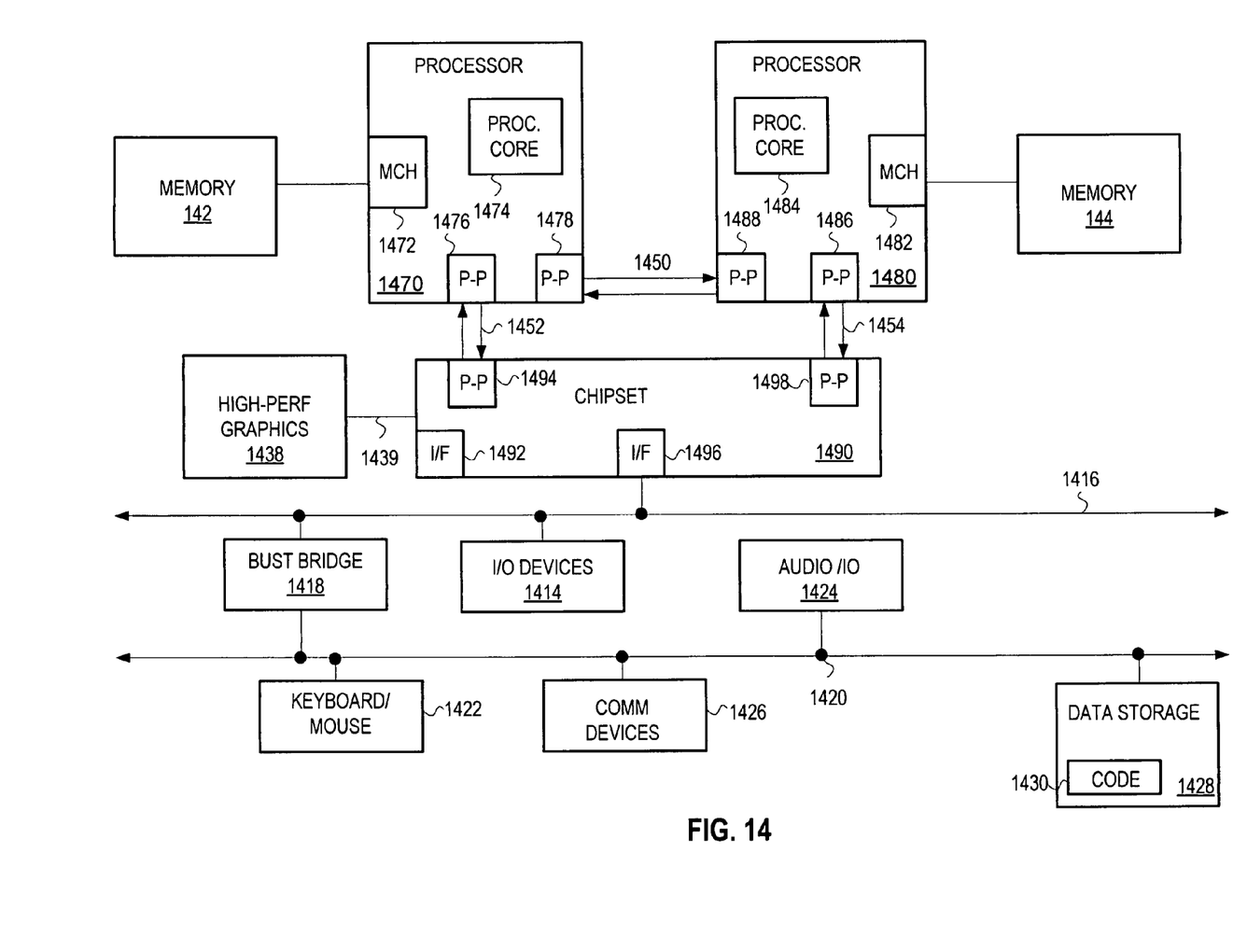
FIG. 14 illustrates an exemplary computer system that is arranged in a point-to-point configuration.

Furthermore, the cache memory may contain relatively fast memory cells, such as a six-transistor (6T) cell, or other memory cell of approximately equal or faster access speed. The computer system of FIG. 13 may be a P2P network of bus agents, such as microprocessors, that communicate via bus signals dedicated to each agent on the P2P network. FIG. 14 illustrates a computer system that is arranged in a P2P configuration. In particular, FIG. 14 shows a system where processors, memory, and input/output devices are interconnected by a number of point-to-point interfaces.

The system of FIG. 14 may also include several processors, of which only two, processors 1470, 1480 are shown for clarity. Processors 1470, 1480 may each include a local memory controller hub (MCH) 1472, 1482 to connect with memory 102, 104. Processors 1470, 1480 may exchange data via a P2P interface 1450 using P2P interface circuits 1478, 1488. Processors 1470, 1480 may each exchange data with a chipset 1490 via individual P2P interfaces 1452, 1454 using P2P interface circuits 1476, 1494, 1486, 1498. Chipset 1490 may also exchange data with a high-performance graphics circuit 1438 via a high-performance graphics interface 1439.

Other embodiments of the invention, however, may exist in other groups of circuits, logic units, or devices within the system of FIG. 14. Accordingly, the scope of the invention should be judged in terms of the claims which follow.

What is claimed is:

1. A method of timing alignment between a receiving device and transmitting device coupled over a serial interconnect, the method comprising:

determining a first position of a clock signal in relation to a clock pattern data signal sent from the transmitting device to the receiving device;

determining a second position of the clock signal in relation to a random data pattern test data and the first position;

determining an offset as the difference between the first and second positions; and applying the offset to incoming data to align said incoming data.

2. The method of claim 1, further comprising storing the offset in a memory.

3. The method of claim 1, wherein the first position is the position of the eye center of the clock pattern data signal.

4. The method of claim 3, wherein determining the first position includes determining a left edge and a right edge of the data signal.

5. The method of claim 1, wherein the random data pattern is predetermined.

6. The method of claim 5, wherein determining the, second position of the clock signal includes determining a left edge and a right edge of the random data pattern signal.

7. The method of claim 6, wherein determining a position of the clock signal includes:

capturing a data string from the data signal using the clock signal for timing;

determining if errors exist in the data string;

if errors do not exist when determining the left edge, advancing the clock signal;

if errors exist when determining the left edge, delaying the clock signal; and if errors do not exist when determining the right edge, delaying the clock signal.

8. The method of claim 7, wherein capturing a data string, determining if errors exist, and shifting the clock signal is repeated until an error exists when determining the left edge or the right edge.

9. The method of claim 1, further comprising:
determining a third position of the clock signal in relation to a clock pattern data signal sent from the transmitting device to the receiving device to retrain the clock signal.

10. An apparatus, comprising:
a port to receive a clock pattern data signal;
a module to determine a first position of a clock signal in relation to a clock pattern data signal sent from the transmitting device to the receiving device;
a module to determine a second position of the clock signal in relation to a random data pattern test data and the first position;
a module to determine an offset as the difference between the first and second positions; and
a module to apply the offset to incoming data to align said incoming data.

11. The apparatus of claim 10, further comprising a memory to store the offset.

12. The apparatus of claim 11, wherein the module to determine the first position determines a left edge, a right edge, and an eye center of the clock pattern data signal, the eye center being the first position of the clock signal.

13. The apparatus of claim 12, further comprising a module to buffer the clock signal so that a swing of the clock signal is aligned with the eye center of the test data signal.

14. The apparatus of claim 13, wherein the eye center is at the midpoint of an open portion of the data signal.

15. The apparatus of claim 10, further comprising a plurality of ports to receive a plurality of test data signals.

16. A system comprising:
a transmitter to send a clock pattern data signal and a clock signal;
a receiver to receive the clock pattern data signal and the clock signal from the transmitter, the receiver including:
a port to receive a clock pattern data signal;
a module to determine a first position of a clock signal in relation to a clock pattern data signal sent from the transmitting device to the receiving device;
a module to determine a second position of the clock signal in relation to a random data pattern test data and the first position;
a module to determine an offset as the difference between the first and second positions; and
a module to apply the offset to incoming data to align said incoming data.

* * * * *